United States Patent

Saimen et al.

(10) Patent No.: US 9,153,840 B2
(45) Date of Patent: Oct. 6, 2015

(54) LITHIUM ION CONDUCTIVE COMPOSITE ELECTROLYTE AND LITHIUM ION SECONDARY BATTERY USING SAME

(71) Applicants: Kazuki Saimen, Saitama (JP); Yuki Ito, Saitama (JP); Yuji Isogai, Saitama (JP)

(72) Inventors: Kazuki Saimen, Saitama (JP); Yuki Ito, Saitama (JP); Yuji Isogai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 2 days.

(21) Appl. No.: 13/782,697

(22) Filed: Mar. 1, 2013

(65) Prior Publication Data

US 2013/0230778 A1    Sep. 5, 2013

(30) Foreign Application Priority Data

Mar. 2, 2012   (JP) ................. 2012-047390

(51) Int. Cl.
*H01M 4/13* (2010.01)
*H01M 10/056* (2010.01)
*H01M 10/0525* (2010.01)

(52) U.S. Cl.
CPC ........ *H01M 10/056* (2013.01); *H01M 10/0525* (2013.01); *Y02E 60/122* (2013.01)

(58) Field of Classification Search
USPC ....................................... 429/218.1
See application file for complete search history.

(56) References Cited

U.S. PATENT DOCUMENTS

| | | | |
|---|---|---|---|
| 6,475,677 B1 | 11/2002 | Inda et al. | |
| 2006/0286446 A1* | 12/2006 | Chun et al. | 429/142 |
| 2008/0118833 A1* | 5/2008 | Ueda et al. | 429/209 |
| 2011/0274987 A1* | 11/2011 | Ihara et al. | 429/337 |

FOREIGN PATENT DOCUMENTS

| | | | |
|---|---|---|---|
| JP | 2000-123633 A | 4/2000 | |
| JP | 2001-015164 A | 1/2001 | |

OTHER PUBLICATIONS

Wang et al. High Ionic Conductivity Lithium Garnet Oxides of Li7—xLa3Zr2—xTaxO12 Compositions, Electrochmeical and Solid State Letters 15(5).*

(Continued)

*Primary Examiner* — Ula Ruddock
*Assistant Examiner* — Jacob Marks
(74) *Attorney, Agent, or Firm* — Capitol City TechLaw, PLLC; Samuel P. Burkholder

(57) ABSTRACT

Provided is a lithium ion conductive composite electrolyte that can prevent leakage of electrolyte solution, and that have excellent cycle performance and lithium ion conductivity, and a lithium ion secondary battery. A lithium ion conductive composite electrolyte 1 is formed so that a lithium ion conductive polymer gel electrolyte is held in a porous body 2 formed from lithium ion conductive inorganic solid electrolyte particles and an organic polymer. The lithium ion conductive inorganic solid electrolyte particles are formed from a composite metal oxide that has a garnet structure, and is represented by the chemical formula $Li_{7-y}La_{3-x}A_xZr_{2-y}M_yO_{12}$ (wherein $0 \le x \le 3$, $0 \le y \le 2$, A is one of Y, Nd, Sm, and Gd, and M is Nb or Ta). A lithium ion secondary battery 11 includes the lithium ion conductive composite electrolyte 1 between a positive electrode 12 and a negative electrode 13.

4 Claims, 6 Drawing Sheets

(56) References Cited

OTHER PUBLICATIONS

Wang et al. (High Ionic Conductivity Lithium Garnet Oxides of Li7—xLa3Zr2—xTaxO12 Compositions, Electrochmeical and Solid State Letters 15(5)).*

Murugan, R; Thangadurai, V., and Weppner, W., "Fast Lithium Ion Conduction in Garnet-Type Li7La3Zr2O12," Angew. Chem. Int. Ed., Sep. 5, 2007, pp. 7778-7781, vol. 46, Wiley-VCH Verlag GmbH & Co. KGaA, Weinheim, Germany.

* cited by examiner

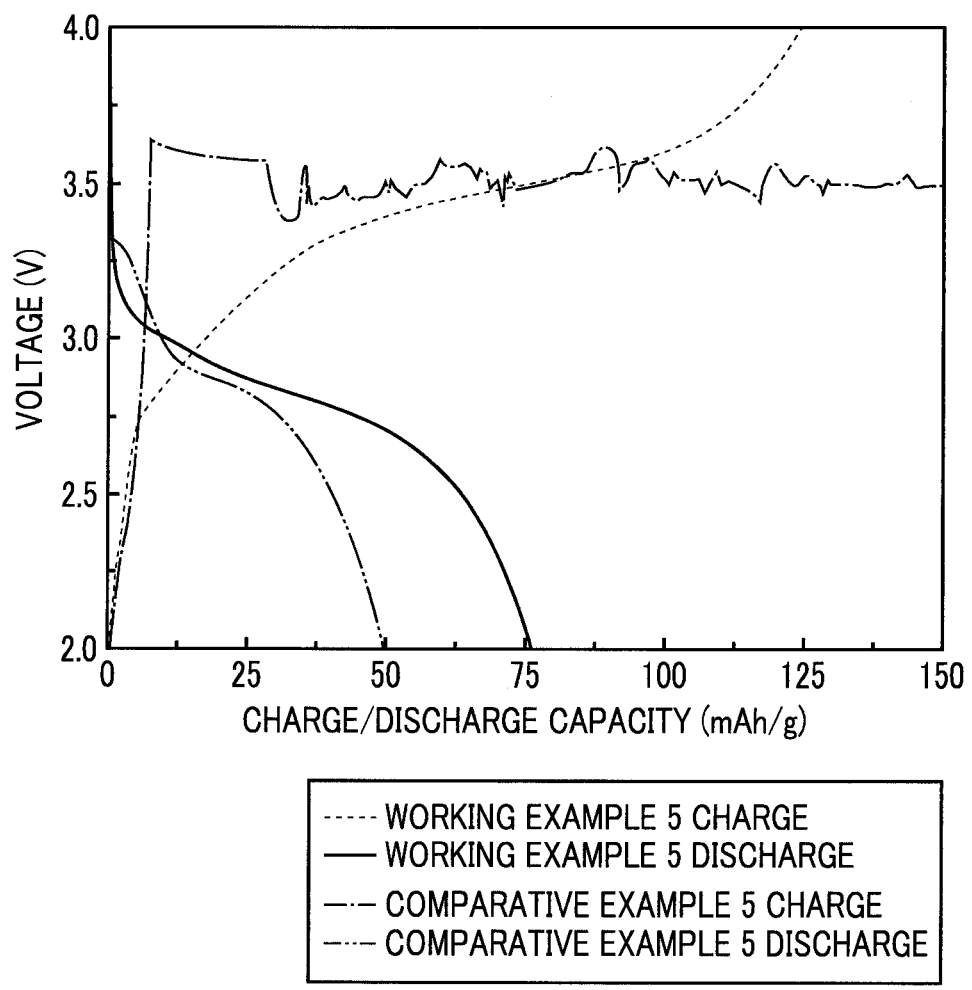

LITHIUM ION CONDUCTIVE COMPOSITE ELECTROLYTE AND LITHIUM ION SECONDARY BATTERY USING SAME

CROSS-REFERENCE TO RELATED APPLICATIONS

This application is based upon and claims the benefit of priority from Japanese Patent Application No. 2012-047390 filed on Mar. 2, 2012, the contents of which are incorporated herein by reference.

BACKGROUND OF THE INVENTION

1. Field of the Invention

The present invention relates to a lithium ion conductive composite electrolyte and a lithium ion secondary battery using the same.

2. Description of the Related Art

Conventionally, a non-aqueous electrolyte solution has been used for a lithium ion conductive electrolyte in a lithium ion secondary battery. Such a non-aqueous electrolyte solution has a lithium salt, such as $LiPF_6$ and $LiBF_6$, dissolved as a supporting salt in an organic solvent, such as propylene carbonate, ethylene carbonate, diethyl carbonate, and dimethyl carbonate. However, in a lithium ion secondary battery using such an electrolyte solution, the electrolyte solution can externally leak if the container is damaged or the like.

To prevent leakages of the electrolyte solution, a polymer gel electrolyte has been proposed as the lithium ion conductive composite electrolyte, in which the non-aqueous electrolyte solution is absorbed into an organic polymer. However, since this polymer gel electrolyte has a low strength and is pliable, it is difficult to handle during production of the lithium ion secondary battery, and the problem is that the positive electrode and the negative electrode tend to short-circuit, for example.

To resolve the above-described problems, a composite electrolyte has been proposed in which, to confer a required strength to the polymer gel electrolyte, the polymer gel electrolyte is held in a porous body that is three-dimensionally formed from electrochemically inert inorganic particles (see, for example, Japanese Patent Laid-Open No. 2000-123633). In this composite electrolyte, $SiO_2$, $MgO$, $Al_2O_3$ and the like are used as the inorganic particles.

However, in such a composite electrolyte, since the inorganic particles do not have lithium ion conductivity, there is unevenness in the diffusion of the lithium ions on the negative electrode surface between the portion in which the polymer gel electrolyte is present and the portion in which the inorganic particle is present. Consequently, if a charge/discharge cycle is repeated, dendrites grow in the portion in which the polymer gel electrolyte is present, which causes the positive electrode and the negative electrode in the lithium ion secondary battery to short-circuit, so that sufficient cycle performance cannot be obtained.

One method to overcome this is to use inorganic particles having lithium ion conductivity instead of the above-described electrochemically inert inorganic particles. A known example of such inorganic particles is a glass ceramic represented by the chemical formula $Li_{1+x-y}Al_xTi_{2-x}Si_yP_{3-y}O_{12}$ (wherein $0 \leq x \leq 0.4$, $0 < y \leq 0.6$) (see, for example, Japanese Patent Laid-Open No. 2001-015164).

The inorganic particles represented by the chemical formula $Li_{1+x-y}Al_xTi_{2-x}Si_yP_{3-y}O_{12}$ have a reduction potential of 1.5 V based on a $Li^+/Li$ electrode reaction potential. On the other hand, when a negative electrode formed from a high-capacity material, such as Li, Si, and Sn, is used in a lithium ion secondary battery, Li has a reduction potential of 0 V, S of 0.5 V, and Sn of 1.0 V. Specifically, since the above-described inorganic particles have a larger reduction potential than the high-capacity material, such as Li, Si, and Sn, they are more easily reduced than the high-capacity material.

Consequently, a composite electrolyte that uses inorganic particles represented by the chemical formula $Li_{1+x-y}Al_xTi_{2-x}Si_yP_{3-y}O_{12}$, suffers from the problem which is that when the charge/discharge cycle is repeated the inorganic particles are reduced, and lithium ion conductivity is lost. If the inorganic particles lose their lithium ion conductivity, as in the case of the above-described electrochemically inert inorganic particles, dendrites grow in the portion in which the polymer gel electrolyte is present, so that sufficient cycle performance cannot be obtained.

Further, as inorganic particles having lithium ion conductivity, a composite metal oxide represented by the chemical formula $Li_7La_3Zr_2O_{12}$ and having a garnet structure is known (see, for example, Murugan et al., Angew. Chem. Int. Ed. 46 (2007), pp. 7778 to 7781). This composite metal oxide could be used for the inorganic particles forming the above-described composite electrolyte.

However, this composite metal oxide represented by the chemical formula $Li_7La_3Zr_2O_{12}$ and having a garnet structure suffers from the drawback of agglomerating when forming the composite electrolyte along with the polymer gel electrolyte, so that sufficient lithium ion conductivity cannot be obtained.

SUMMARY OF THE INVENTION

It is an object of the present invention to provide a lithium ion conductive composite electrolyte that resolves the above-described problems, can prevent leakage of electrolyte solution, and has excellent cycle performance and lithium ion conductivity, and a lithium ion secondary battery using the same.

To achieve the above-described objectives, the lithium ion conductive composite electrolyte according to the present invention comprises a composite electrolyte in which a lithium ion conductive polymer gel electrolyte is held in a porous body formed from lithium ion conductive inorganic solid electrolyte particles, wherein the porous body is formed from an organic polymer, and lithium ion conductive inorganic solid electrolyte particles that are formed from a composite metal oxide that is represented by the chemical formula $Li_{7-y}La_{3-x}A_xZr_{2-y}M_yO_{12}$ (wherein $0 \leq x \leq 3$, $0 \leq y \leq 2$, A is one metal selected from the group consisting of Y, Nd, Sm, and Gd, and M is one metal selected from Nb or Ta), and that has a garnet structure.

In the lithium ion conductive composite electrolyte according to the present invention, the above-described lithium ion conductive polymer gel electrolyte is held in the above-described porous body formed from the lithium ion conductive inorganic solid electrolyte particles and the organic polymer. Therefore, in the lithium ion conductive composite electrolyte according to the present invention, all of the electrolyte is a solid, so that there is no leakage of electrolyte solution.

Further, in the lithium ion conductive composite electrolyte according to the present invention, the composite metal oxide has lithium ion conductivity. Therefore, when the lithium ion conductive composite electrolyte according to the present invention is used in a lithium ion secondary battery, there is no unevenness in the diffusion of lithium ions on the negative electrode surface between the portion in which the lithium ion conductive polymer gel electrolyte is present and the portion in which the composite metal oxide is present. Consequently, the occurrence of shorting between the positive electrode and the negative electrode due to the growth of dendrites can be prevented.

Further, the composite metal oxide forming the above-described lithium ion conductive inorganic solid electrolyte particles has a reduction potential of less than 0 V based on a $Li^+/Li$ electrode reaction potential. Consequently, in the lithium ion conductive composite electrolyte according to the present invention, the composite metal oxide is not reduced even if charge/discharge is repeated in a lithium ion secondary battery that uses a high-capacity material, such as Li, Si, and Sn, for the negative electrode.

Further, the lithium ion conductive composite electrolyte according to the present invention can suppress deterioration of the battery performance that occurs when charge/discharge is repeated in a lithium ion secondary battery, thus enabling excellent cycle performance to be obtained.

In addition, in the lithium ion conductive composite electrolyte according to the present invention, it is preferred that the lithium ion conductive inorganic solid electrolyte particles and the organic polymer forming the porous body have a volume ratio of lithium ion conductive inorganic solid electrolyte particles:organic polymer in the range of 54:46 to 91:9.

In the lithium ion conductive composite electrolyte according to the present invention, the volume ratio of the lithium ion conductive inorganic solid electrolyte particles and the organic polymer forming the porous body is in the above-described range. Therefore, the organic polymer allows the composite metal oxide forming the above-described lithium ion conductive inorganic solid electrolyte particles to be dispersed without forming agglomerates, thereby enabling good contact among the composite metal oxides in either the horizontal or perpendicular direction. Consequently, when used in a lithium ion secondary battery, the lithium ion conductive composite electrolyte according to the present invention can obtain excellent lithium ion conductivity and can increase the charge/discharge capacity of the lithium ion secondary battery.

If the volume ratio of lithium ion conductive inorganic solid electrolyte particles:organic polymer between the lithium ion conductive inorganic solid electrolyte particles and the organic polymer is less than 54:46, there is excessive organic polymer. Consequently, the organic polymer covers the surface of the lithium ion conductive inorganic solid electrolyte particles, so that the lithium ion conductive composite electrolyte according to the present invention may not obtain sufficient lithium ion conductivity. Further, if the above-described volume ratio of lithium ion conductive inorganic solid electrolyte particles:organic polymer between the lithium ion conductive inorganic solid electrolyte particles and the organic polymer is more than 91:9, there are excessive lithium ion conductive inorganic solid electrolyte particles, which can cause agglomerates to form.

In the lithium ion conductive composite electrolyte according to the present invention, it is more preferred that the lithium ion conductive inorganic solid electrolyte particles and the organic polymer have a volume ratio of lithium ion conductive inorganic solid electrolyte particles:organic polymer in the range of 81:19 to 91:9. Consequently, when used in a lithium ion secondary battery, the lithium ion conductive composite electrolyte can obtain even better lithium ion conductivity.

If the volume ratio of lithium ion conductive inorganic solid electrolyte particles:organic polymer between the lithium ion conductive inorganic solid electrolyte particles and the organic polymer is less than 81:19, the ratio of organic polymer covering the surface of the lithium ion conductive inorganic solid electrolyte particles increases. Consequently, the lithium ion conductivity of the lithium ion conductive composite electrolyte according to the present invention decreases.

The lithium ion conductive composite electrolyte according to the present invention can obtain a required strength, because, as described above, the above-described lithium ion conductive polymer gel electrolyte is held in the above-described porous body formed from the lithium ion conductive inorganic solid electrolyte particles and the organic polymer. However, for the lithium ion conductive composite electrolyte according to the present invention, it is more preferred that the porous body is formed on a porous substrate in which a lithium ion conductive polymer gel electrolyte is held.

By forming the porous body on the porous substrate, the lithium ion conductive composite electrolyte according to the present invention can obtain an even better strength, and can thus be handled easily. Further, since the lithium ion conductive polymer gel electrolyte is held in the porous substrate, deterioration in the lithium ion conductivity of the lithium ion conductive composite electrolyte according to the present invention can be avoided because of this porous substrate.

The lithium ion conductive composite electrolyte according to the present invention can be used in a lithium ion secondary battery. Therefore, the lithium ion secondary battery according to the present invention comprises a positive electrode that includes a positive electrode active material, a negative electrode that includes a negative electrode active material, and the above-described lithium ion conductive composite electrolyte that is provided between the positive electrode and the negative electrode.

By comprising the lithium ion conductive composite electrolyte, the lithium ion secondary battery according to the present invention can obtain excellent cycle performance and charge/discharge capacity.

BRIEF DESCRIPTION OF THE DRAWINGS

FIG. 7 is a graph illustrating a charge/discharge curve for a first cycle in the lithium ion secondary battery according to yet another Working Example of the present invention.

DETAILED DESCRIPTION OF THE PREFERRED EMBODIMENTS

Next, embodiments of the present invention will be described in more detail with reference to the attached drawings.

Figure 1:
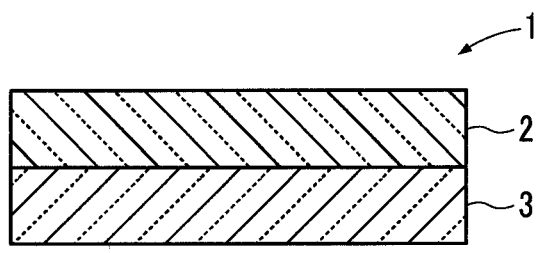
FIG. 1 is an explanatory cross-sectional diagram illustrating a structure of the lithium ion conductive composite electrolyte according to the present invention.

As illustrated in FIG. 1, a lithium ion conductive composite electrolyte 1 according to the present embodiment comprises a porous body 2, in which a lithium ion conductive polymer gel electrolyte is held. The porous body 2 is formed on a porous substrate 3, in which a lithium ion conductive polymer gel electrolyte is held.

The porous body 2 is formed from an organic polymer and lithium ion conductive inorganic solid electrolyte particles formed from a composite metal oxide that is represented by the chemical formula $Li_{7-y}La_{3-x}A_xZr_{2-y}M_yO_{12}$ (wherein $0 \leq x \leq 3$, $0 \leq y \leq 2$, A is one metal selected from the group consisting of Y, Nd, Sm, and Gd, and M is one metal selected from Nb or Ta), and has a garnet structure.

The lithium ion conductive inorganic solid electrolyte particles may be a composite metal oxide represented by the chemical formula $Li_7La_3Zr_2O_{12}$, or a composite metal oxide in which a part or all of the La sites or Zr sites are substituted with some other metal. The metal A that can replace a La site in the composite metal oxide represented by the chemical formula $Li_7La_3Zr_2O_{12}$ is one metal selected from the group consisting of Y, Nd, Sm, and Gd. Further, the metal M that can replace a Zr site is one metal selected from Nb or Ta.

The electrochemical stability of the lithium ion conductive inorganic solid electrolyte particles according to the present embodiment can be evaluated by calculating the redox potential from the change in free energy when one atom is inserted into or removed from a unit cell of the composite metal oxide represented by the above-described chemical formula and having a garnet type structure. The change in free energy can be determined based on a first principle calculation method under the conditions of a cut-off energy of 480 eV and a k point of =3×3×3, using a VASP (Vienna Ab initio Simulation Package), which is a first principle electronic state calculation program, based on a GGA (generalized gradient approximation)/PAW (projector augmented wave) method. The redox potential is the reduction potential and the oxidation potential based on a $Li^+/Li$ electrode reaction potential.

Next, based on the above-described method, the redox potentials of composite metal oxides represented by the chemical formula $Li_{7-y}La_{3-x}A_xZr_{2-y}M_yO_{12}$ (wherein $0 \leq x \leq 3$, $0 \leq y \leq 2$, A is one metal selected from the group consisting of Y, Nd, Sm, and Gd, and M is one metal selected from Nb or Ta), and having a garnet structure, were calculated in the manner described above. The results are shown in Table 1.

TABLE 1

|  | Reduction Potential (V) | Oxidation Potential (V) |
| --- | --- | --- |
| $Li_7La_3Zr_2O_{12}$ | −1.67 | 4.60 |
| $Li_{7-y}La_3Zr_{2-y}Nb_yO_{12}$ | −0.06 | 4.72 |
| $Li_{7-y}La_{3-x}Y_xZr_{2-y}Nb_yO_{12}$ | −0.51 | 4.85 |
| $Li_{7-y}La_{3-x}Nd_xZr_{2-y}Nb_yO_{12}$ | −0.10 | 4.66 |
| $Li_{7-y}La_{3-x}Sm_xZr_{2-y}Nb_yO_{12}$ | −0.07 | 4.60 |
| $Li_{7-y}La_{3-x}Gd_xZr_{2-y}Nb_yO_{12}$ | −0.09 | 4.60 |
| $Li_{7-y}La_3Zr_{2-y}Ta_yO_{12}$ | −0.66 | 4.71 |
| $Li_{7-y}La_{3-x}Y_xZr_{2-y}Ta_yO_{12}$ | −1.05 | 4.83 |
| $Li_{7-y}La_{3-x}Nd_xZr_{2-y}Ta_yO_{12}$ | −0.71 | 4.79 |
| $Li_{7-y}La_{3-x}Sm_xZr_{2-y}Ta_yO_{12}$ | −0.67 | 4.74 |
| $Li_{7-y}La_{3-x}Gd_xZr_{2-y}Ta_yO_{12}$ | −0.84 | 4.76 |

From Table 1, it is clear that all of the composite metal oxides represented by the chemical formula $Li_{7-y}La_{3-x}A_xZr_{2-y}M_yO_{12}$ (wherein $0 \leq x \leq 3$, $0 \leq y \leq 2$, A is one metal selected from the group consisting of Y, Nd, Sm, and Gd, and M is one metal selected from Nb or Ta), and having a garnet structure, have a large potential window indicated by the difference between the oxidation potential and the reduction potential, and exhibit excellent electrochemical stability.

Especially, all of the above-described composite metal oxides have a reduction potential of less than 0 V based on a $Li^+/Li$ electrode reaction potential, so that they are not reduced even if charge/discharge is repeated in a lithium ion secondary battery that uses a high-capacity material, such as Li, Si, and Sn, for the negative electrode. Further, since all of the above-described composite metal oxides have an oxidation potential of 4.0 V or more based on a $Li^+/Li$ electrode reaction potential, there is no oxidation in the range of 4.0 V or less. Consequently, an electromotive force of at least 4.0 V can be obtained for the lithium ion secondary battery.

As the organic polymer that forms the porous body 2 along with the lithium ion conductive inorganic solid electrolyte particles formed from the above-described composite metal oxide, an organic polymer that is stable at the operating voltage of the lithium ion secondary battery may be used. Examples of such an organic polymer include a polyolefin, a fluororesin, a polyimide, an acrylic resin, styrene-butadiene rubber (SBR), and polycarboxymethyl cellulose (CMC).

Examples of the polyolefin include polyethylene and polypropylene. Further, examples of the fluororesin include polytetrafluoroethylene (PTFE) and polyvinylidene fluoride.

The organic polymer may be used singly or in combinations of two or more thereof. Further, the organic polymer may comprise a proton-donating group, such as a carboxyl group and a hydroxyl group, in the molecule structure, so that agglomeration of the organic polymer itself or of the above-described lithium ion conductive inorganic solid electrolyte particles can be can suppressed.

In the porous body 2, it is preferred that the lithium ion conductive inorganic solid electrolyte particles and the organic polymer have a volume ratio of lithium ion conductive inorganic solid electrolyte particles:organic polymer in the range of 54:46 to 91:9.

If the volume ratio between the lithium ion conductive inorganic solid electrolyte particles and the organic polymer is less than 54:46, the organic polymer covers the surface of the lithium ion conductive inorganic solid electrolyte particles. Consequently, the lithium ion conductive composite electrolyte 1 may not obtain sufficient lithium ion conductivity. Further, the fact that the above-described volume ratio is less than 54:46 means that in the porous body 2, based on the total of the lithium ion conductive inorganic solid electrolyte particles and the organic polymer, the content of the organic polymer exceeds 46 vol. %.

If this volume ratio is more than 91:9, there are excessive lithium ion conductive inorganic solid electrolyte particles, which can cause agglomerates to form. In addition, the fact that the this volume ratio is more than 91:9 means that in the porous body 2, based on the total of the lithium ion conductive inorganic solid electrolyte particles and the organic polymer, the content of the lithium ion conductive inorganic solid electrolyte particles exceeds 91 vol. %.

In the porous body 2, it is more preferred that the above-described volume ratio is in the range of 81:19 to 91:9. If this volume ratio is less than 81:19, the ratio of organic polymer covering the surface of the lithium ion conductive inorganic solid electrolyte particles increases. Consequently, the lithium ion conductivity of the lithium ion conductive composite electrolyte 1 may decrease.

The lithium ion conductive polymer gel electrolyte held in the porous body 2 is formed from a lithium ion conductive electrolyte solution and a polymer capable of internally absorbing this electrolyte solution. The lithium ion conductive electrolyte solution is formed from a lithium salt and an organic solvent capable of dissolving this lithium salt.

Examples of the lithium salt include $LiPF_6$, $LiBF_4$, $LiClO_4$, $LiCF_3SO_3$, and $LiN(CF_3SO_2)_2$. Examples of the organic solvent include cyclic esters, such as ethylene carbonate (EC), propylene carbonate (PC), γ-butyrolactone (γ-BL), and linear esters, such as diethyl carbonate (DEC), ethyl methyl carbonate (EMC), and dimethyl carbonate (DMC). The organic solvent may be used singly or in combinations of two or more thereof.

Examples of the polymer capable of internally absorbing the above-described electrolyte solution include a thermoplastic polymer, a thermosetting polymer, and a copolymer obtained by polymerizing two or more monomers or oligomers of such thermoplastic polymer or such thermosetting polymer. Examples of this thermoplastic polymer include polyethylene oxide (PEO), polyvinylidene fluoride (PVdf), and polyacrylonitrile (PAN). Examples of this thermosetting polymer include a thermosetting polymer obtained by polymerization of tetraethylene glycol diacrylate, polyethylene glycol diacrylate, and trimethylolpropane triacrylate.

An especially preferred example of the polymer capable of internally absorbing the above-described electrolyte solution is a polymer obtained by polymerization of an acrylate monomer. Since a polymer obtained by polymerization of an acrylate monomer has a fast rate of polymerization, productivity can be increased.

Examples of the acrylate monomer include monomers such as monoacrylates, alkane diol diacrylates, polyethylene glycol diacrylates, and polypropylene glycol diacrylates.

Examples of the monoacrylate monomer include methyl acrylate, acrylamide, 2-ethoxyethyl acrylate, diethylene glycol alkyl ether acrylate, polyethylene glycol alkyl ether acrylate, and 2-cyano ethyl acrylate.

Examples of the alkane diol diacrylate monomer include 1,2-butanediol diacrylate, 1,3-butanediol diacrylate, 1,4-butanediol diacrylate, neo-pentane diol diacrylate, and 1,6-hexanediol diacrylate.

Examples of the polyethylene glycol diacrylate monomer include ethylene glycol diacrylate, diethylene glycol diacrylate, triethylene glycol diacrylate, and tetraethylene glycol diacrylate.

Examples of the polypropylene glycol diacrylate monomer include propylene glycol diacrylate, dipropylene glycol diacrylate, tripropylene glycol diacrylate, and tetrapropylene glycol diacrylate.

Further examples of the acrylate monomer include trimethylolpropane triacrylate, trimethylolpropane ethoxylate triacrylate, trimethylolpropane propoxylate acrylate, isocyanuric acid ethoxylate triacrylate, glycerol ethoxylate triacrylate, glycerol propoxylate triacrylate, pentaerythritol ethoxylate tetraacrylate, and ditrimethylolpropane tetraacrylate.

In addition, for the acrylate monomer, it is preferred that two or more monomers that have two or more acrylic groups, such as a diacrylate and a triacrylate, are polymerized to form a copolymer. Since the crosslinking density improves with such a copolymer, the mechanical strength of the above-described polymer gel can be increased even further.

In the lithium ion conductive polymer gel electrolyte, the content of the lithium ion conductive electrolyte solution is preferably, based on the total of the electrolyte solution and the polymer, in the range of 30 to 95 mass %, and more preferably in the range of 50 to 90 mass %.

In the lithium ion conductive polymer gel electrolyte, if the content of the lithium ion conductive electrolyte solution is less than 30 mass % based on the total of the electrolyte solution and the polymer, sufficient lithium ion conductivity may not be obtained. Further, if the content of the lithium ion conductive electrolyte solution is more than 95 mass % based on the total of the electrolyte solution and the polymer, the polymer gel may not have a sufficient mechanical strength. Setting the content of the lithium ion conductive electrolyte solution in the range of 50 to 90 mass % based on the total of the electrolyte solution and the polymer ensures that the required lithium ion conductivity and polymer gel mechanical strength can be obtained.

In the porous body 2, it is preferred that the volume ratio between the total of the lithium ion conductive inorganic solid electrolyte particles and the organic polymer, and the lithium ion conductive polymer gel electrolyte, is in the range of (lithium ion conductive inorganic solid electrolyte particles+ organic polymer):lithium ion conductive polymer gel electrolyte=70:30 to 85:15. Setting this volume ratio in the above-described range allows the lithium ion conductive inorganic solid electrolyte particles and the lithium ion conductive polymer gel electrolyte to be uniformly dispersed in the porous body 2, so that conduction paths for the lithium ions can be formed throughout the whole of the porous body 2. Consequently, the lithium ion conductivity of the porous body 2 can be increased.

It is preferred to use for the porous substrate 3 a material that has both strength and shape conformability due to excellent elasticity. Examples of such a material include a microporous membrane made from polyolefin, a microporous membrane made from glass, non-woven or woven cloth made from polyolefin fiber, and non-woven or woven cloth made from glass fiber.

In order to hold the lithium ion conductive polymer gel electrolyte, it is preferred that the porous substrate 3 has a void ratio in the range of 30 to 90 vol. %. If the void ratio is less than 30 vol. %, a sufficient amount of lithium ion conductive polymer gel electrolyte may not be held, which can prevent sufficient lithium ion conductivity from being obtained. If the void ratio is more than 90 vol. %, a sufficient mechanical strength may not be obtained.

Examples of the lithium ion conductive polymer gel electrolyte held in the porous substrate 3 include exactly the same examples as mentioned above for the lithium ion conductive polymer gel electrolyte held in the porous body 2.

Next, a method for producing the lithium ion conductive composite electrolyte 1 according to the present embodiment will be described.

When producing the lithium ion conductive composite electrolyte 1, first, the above-described lithium ion conductive inorganic solid electrolyte particles are prepared. These lithium ion conductive inorganic solid electrolyte particles can be obtained by firing a raw material mixture of a Li compound, a La compound, and a Zr compound. At this stage, a compound of one metal selected from the group consisting of Y, Nd, Sm, and Gd, and a compound of one metal selected from Nb or Ta, may be mixed into the raw material mixture.

Further, by adding at this stage a sintering aid formed from an Al compound and a Si compound, or a sintering aid formed from an Al compound and a Ge compound, to the raw material mixture and then firing, sintering is promoted, so that a denser lithium ion conductive material can be obtained.

Examples of the Li compound include LiOH or its hydrate, $Li_2CO_3$, $LiNO_3$, and $CH_3COOLi$. Examples of the La compound include $La_2O_3$, $La(OH)_3$, $La_2(CO_3)_3$, $La(NO_3)_3$, and $(CH_3COO)_3La$. Examples of the Zr compound include $Zr_2O_2$, $ZrO(NO_3)_2$, $ZrO(CH_3COO)_2$, $Zr(OH)_2CO_3$, and $ZrO_2$.

Examples of the Y compound include $Y_2O_3$, $Y_2(CO_3)_3$, $Y(NO_3)_3$, and $(CH_3COO)_3Y$. Examples of the Nd compound include $Nd_2O_3$, $Nd_2(CO_3)_3$, $Nd(NO_3)_3$, and $(CH_3COO)_3Nd$.

Examples of the Sm compound include $Sm_2O_3$, $Sm_2(CO_3)_3$, $Sm(NO_3)_3$, and $(CH_3COO)_3Sm$. Examples of the Gd compound include $Gd_2O_3$, $Gd_2(CO_3)_3$, $Gd(NO_3)_3$, and $(CH_3COO)_3Gd$.

Examples of the Nb compound include $Nb_2O_5$, $NbO_2$, $NbCl_5$, and $LiNbO_3$. Examples of the Ta compound include $Ta_2O_5$, $TaCl_5$, and $LiTaO_3$.

Examples of the Al compound include $Al_2O_3$, $Al(OH)_3$, and $Al(NO_3)_3$. Examples of the Si compound include $SiO_2$, tetraethoxysilane, and orthosilicate. Examples of the Ge compound include $GeO_2$, germanium ethoxide, and $GeCl_4$.

The firing is carried out by, first, pulverizing and mixing the above-described raw material mixture with a pulverizing and mixing device, such as a ball mill and a mixer, and then performing primary firing by holding the mixture for a time period in the range of 5 to 7 hours at a temperature in the range of 850 to 950° C. Next, the fired body obtained by this primary firing is again pulverized and mixed using a pulverizing and mixing device, such as a ball mill and a mixer, and then subjected to secondary firing by holding for a time period in the range of 5 to 7 hours at a temperature in the range of 1,000 to 1,100° C.

Consequently, as the lithium ion conductive inorganic solid electrolyte particles, a composite metal oxide that is represented by the chemical formula $Li_{7-y}La_{3-x}A_xZr_{2-y}M_yO_{12}$ (wherein $0 \leq x \leq 3$, $0 \leq y \leq 2$, A is one metal selected from the group consisting of Y, Nd, Sm, and Gd, and M is one metal selected from Nb or Ta), and has a garnet structure, can be obtained. If the above-mentioned sintering aid is used during the firing, the sintering aid is added to the raw material mixture before the primary firing, and then pulverized and mixed along with the raw material mixture.

Next, the above-described lithium ion conductive inorganic solid electrolyte particles and a solvent containing the above-described organic polymer are mixed to obtain a paste-like mixture. The lithium ion conductive inorganic solid electrolyte particles and the solvent containing the above-described organic polymer are mixed so that, in the porous body 2, the volume ratio of lithium ion conductive inorganic solid electrolyte particles:organic polymer is in the range of 54:46 to 91:9. Further, preferably, these are mixed so that lithium ion conductive inorganic solid electrolyte particles:organic polymer is in the range of 81:19 to 91:9.

Next, the paste-like mixture is coated on the porous substrate 3, and then dried to form the porous body 2 on the porous substrate 3.

Next, the electrolyte solution used for the lithium ion conductive polymer gel electrolyte is prepared. The electrolyte solution is prepared by dissolving the above-described lithium salt in the above-described solvent. In the electrolyte solution, the concentration of the lithium salt is in the range of, for example, 0.1 to 10 mol/liter.

Next, the lithium ion conductive polymer gel electrolyte is prepared. In the lithium ion conductive polymer gel electrolyte, for example, the above-described thermoplastic polymer can be used as the polymer gel capable of internally absorbing the electrolyte solution. At this stage, first, a sol-like liquid is formed by mixing and heating the electrolyte solution and the thermoplastic polymer in a mass ratio of electrolyte solution: thermoplastic polymer of 30:70 to 95:5. Then, this sol-like liquid is impregnated in the porous substrate 3 and in the porous body 2 formed on the porous substrate 3, and the sol-like liquid is turned into a gel by cooling at room temperature.

Consequently, the lithium ion conductive composite electrolyte 1 formed from the porous substrate 3, in which the above-described lithium ion conductive polymer gel electrolyte is held, and the porous body 2, which is formed on the porous substrate 3 and in which the above-described lithium ion conductive polymer gel electrolyte is held, can be obtained.

In the lithium ion conductive polymer gel electrolyte, the above-described thermosetting polymer can also be used for the polymer capable of internally absorbing the electrolyte solution. In this case, first, the electrolyte solution, a monomer or oligomer capable of forming the thermosetting polymer, and a thermal polymerization initiator are mixed and thoroughly stirred to form a gel precursor solution.

Examples of this thermal polymerization initiator include 1,1-di(tert-butylperoxy)-3,3,5-trimethylcyclohexane, 2,2-bis-[4,4-di(tert-butylperoxycyclohexyl)propane], 1,1-di(tert-butylperoxy)-cyclohexane, tert-butylperoxy-2-ethyl hexanoate, benzoyl peroxide, and 2,2-azobisisobutyronitrile. The thermal polymerization initiator is used in an amount in the range of 0.1 to 1 mass % based on the total of the monomer or oligomer.

Next, the gel precursor solution is impregnated in the porous substrate 3 and in the porous body 2 formed on the porous substrate 3, and then heated to turn the gel precursor solution into a gel.

Consequently, the lithium ion conductive composite electrolyte 1 formed from the porous substrate 3, in which the above-described lithium ion conductive polymer gel electrolyte is held, and the porous body 2, which is formed on the porous substrate 3 and in which the above-described lithium ion conductive polymer gel electrolyte is held, can be obtained.

Figure 2:
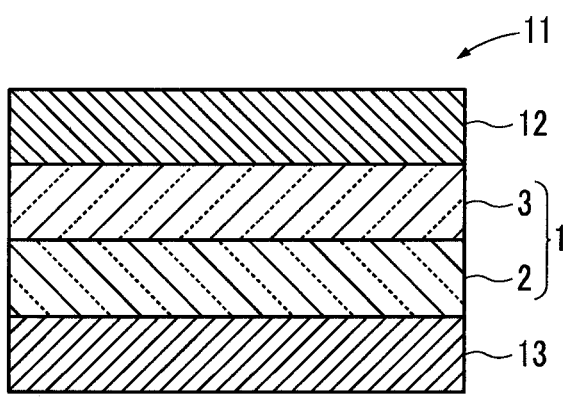
FIG. 2 is an explanatory cross-sectional diagram illustrating a structure of the lithium ion secondary battery according to the present invention.

As illustrated in FIG. 2, a lithium ion secondary battery 11 according to the present embodiment is formed from a positive electrode 12 that includes a positive electrode active material, a negative electrode 13 that includes a negative electrode active material, and the lithium ion conductive composite electrolyte 1, which is provided between the positive electrode 12 and the negative electrode 13.

Examples of the positive electrode active material included in the positive electrode 12 include a transition metal oxide, a composite metal oxide of lithium and a transition metal oxide, and a transition metal sulfide. Examples of the transition metal oxide include MnO, $V_2O_3$, $V_6O_{12}$, and $TiO_2$. Examples of the composite metal oxide include lithium nickelate, lithium cobaltate, lithium manganate, and iron lithium phosphate having an olivine structure. Examples of the transition metal sulfide include TiS, FeS, and $MoS_2$.

Further examples of the positive electrode active material included in the positive electrode 12 include organic compounds such as polyaniline, polypyrrole, polyacene, a disulfide compound, a polysulfide compound, and N-fluoropyridinium.

Examples of the negative electrode active material included in the negative electrode 13 include metal lithium, Si, and Sn. Further examples of the negative electrode active material included in the negative electrode 13 include a lithium alloy or carbon material capable of occluding and releasing lithium.

Since the lithium ion secondary battery 11 according to the present embodiment uses the lithium ion conductive composite electrolyte 1 as an electrolyte, there is no leakage of electrolyte solution.

Further, the lithium ion secondary battery 11 has lithium ion conductivity, because the inorganic solid electrolyte particles included in the lithium ion conductive composite electrolyte 1 are formed from the above-described composite metal oxide. Therefore, in the lithium ion conductive composite electrolyte 1, there is no unevenness in the diffusion of lithium ions on the negative electrode 13 surface between the portion in which the polymer gel electrolyte is present and the portion in which the composite metal oxide is present. Consequently, in the lithium ion secondary battery 11, the occurrence of shorting between the positive electrode 12 and the negative electrode 13 due to the growth of dendrites can be prevented.

Moreover, in the lithium ion secondary battery 11, the composite metal oxide included in the lithium ion conductive composite electrolyte 1 is not reduced due to repeated charge/discharge even if a high-capacity material, such as metal lithium, Si, and Sn is used for the negative electrode active material.

Consequently, according to the lithium ion secondary battery 11, excellent cycle performance can be obtained.

Further, as described above, by using the lithium ion conductive composite electrolyte 1 in the lithium ion secondary battery 11, a high-capacity material, such as metal lithium, Si, and Sn can be used for the negative electrode active material. In addition, the lithium ion conductive composite electrolyte 1 itself has excellent lithium ion conductivity. Therefore, the lithium ion secondary battery 11 can obtain a large charge/discharge capacity.

Next, working examples and comparative examples of the present invention will be illustrated.

WORKING EXAMPLE 1

[1-1. Preparation of Lithium Ion Conductive Inorganic Solid Electrolyte Particles]

In this working example, first, lithium hydroxide monohydrate was subjected to a dehydration treatment by heating for 6 hours at a temperature of 350° C. in a vacuum atmosphere, to obtain lithium hydroxide anhydride. Further, lanthanum oxide was subjected to a dehydration and decarboxylation treatment by heating for 24 hours at a temperature of 950° C. in an air atmosphere.

Next, the lithium hydroxide anhydride, the dehydrated and decarboxylated lanthanum oxide, and zirconium oxide were weighed in a molar ratio of 7.7:3:2, and then pulverized and mixed for 3 hours at a rotation speed of 360 rpm using a planetary ball mill equipped with a zirconium pot and beads, to prepare a raw material mixture.

Next, the raw material mixture was charged into an aluminum crucible, and subjected to primary firing by holding for 6 hours at a temperature of 900° C. in an air atmosphere to obtain a powdery primary fired product. The obtained primary fired product was then pulverized and mixed for 3 hours at a rotation speed of 360 rpm using a planetary ball mill (Trade name: Premium line P-7, manufactured by Fritsch Japan Co., Ltd.). Then, the mixture was charged into an aluminum crucible, and subjected to secondary firing by holding for 6 hours at a temperature of 1,050° C. in an air atmosphere. As a result, lithium ion conductive inorganic solid electrolyte particles formed from a composite metal oxide represented by the chemical formula $Li_7La_3Zr_2O_{12}$ and having a garnet structure were obtained.

[1-2. Production of Porous Body]

Next, the composite metal oxide obtained in this working example and a polyimide varnish as an organic polymer were weighed in a mass ratio of lithium ion conductive inorganic solid electrolyte particles:polyimide of 90:10, and then stirred using a planetary centrifugal mixer to obtain a mixture. The resultant mixture was defoamed, and then further mixed using a thin-film spin mixer to obtain a paste in which the lithium ion conductive inorganic solid electrolyte particles and the polyimide were uniformly dispersed.

Next, this paste was deposited by a casting method using a doctor blade onto a porous substrate 3 formed from a glass fiber non-woven cloth having a thickness of 50 µm and a void ratio of 85%, and then vacuum dried. As a result, a laminate was obtained in which a porous body 2 having a thickness of 50 µm and formed from the above-described lithium ion conductive inorganic solid electrolyte particles and polyimide was formed on the porous substrate 3. In the porous body 2, the volume ratio between the lithium ion conductive inorganic solid electrolyte particles and the polyimide was 56.9: 43.1.

[1-3. Production of Lithium Ion Conductive Composite Electrolyte]

Next, $LiPF_6$ was dissolved in a mixed solvent of ethylene carbonate (EC) and propylene carbonate (PC) mixed in a 1:1 volume ratio to prepare an electrolyte solution in which the $LiPF_6$ concentration was 0.8 mol/liter. Then, in a glove box, 12 parts by mass of polyacrylonitrile with a Mw of 150,000 was mixed at a temperature of 120° C. with 88 parts by mass of the electrolyte solution to obtain a sol-like liquid.

Next, in a glove box, this sol-like liquid was impregnated under pressure into the laminate formed from the porous substrate 3 and the porous body 2 obtained in this working example. The thus-impregnated laminate was left for 12 hours at room temperature (25° C.) to allow the sol-like liquid to be cooled naturally and turned into a gel. In this working example, a lithium ion conductive polymer gel is formed in which the electrolyte solution was absorbed in the polymer gel formed from polyacrylonitrile. As a result, a lithium ion conductive composite electrolyte 1 was obtained in which the lithium ion conductive polymer gel electrolyte was held in the porous substrate 3 and the porous body 2.

[1-4. Production of Lithium Ion Secondary Battery]

First, carbon-coated $LiFePO_4$ (manufactured by Hohsen Corporation) as a positive electrode active material, Ketjenblack (Trade name: EC600JD, manufactured by Lion Corporation) as a conduction aid, and polytetrafluoroethylene were weighed in a mass ratio of 86:6:6, and then mixed using acetone. The resultant mixture was molded with a die of 16 mm in diameter, and then crimped to a stainless steel mesh (SUS 316L) as a current collector to form a positive electrode 12.

Next, metal lithium having a diameter of 15 mm and a thickness of 50 µm was crimped to a stainless steel mesh (SUS 316L) as a current collector to form a negative electrode 13. In this working example, the negative electrode 13 has an electrical capacitance of 14 mAh.

Next, the lithium ion conductive composite electrolyte 1 was provided between the positive electrode 12 and the negative electrode 13 to produce a lithium ion secondary battery 11. In the lithium ion secondary battery 11, the lithium ion conductive composite electrolyte 1 is formed so that the porous substrate 3 is closely adhered to the positive electrode 12, while the porous body 2 is closely adhered to the negative electrode 13.

[1-5. Evaluation of Battery Performance of the Lithium Ion Secondary Battery]

Next, using the lithium ion secondary battery 11 obtained in this working example, the charge/discharge capacity when charge/discharge was repeated at room temperature (25° C.) was measured. The charge/discharge of the lithium ion secondary battery 11 was carried out at a current density of 0.125 $mA/cm^2$ for only the first cycle, and then at a current density of 0.375 mA/cm² for the second and subsequent cycles. Further, the charge cutoff voltage was 4.0 V and the discharge cutoff voltage was 2.5 V.

Figure 3:
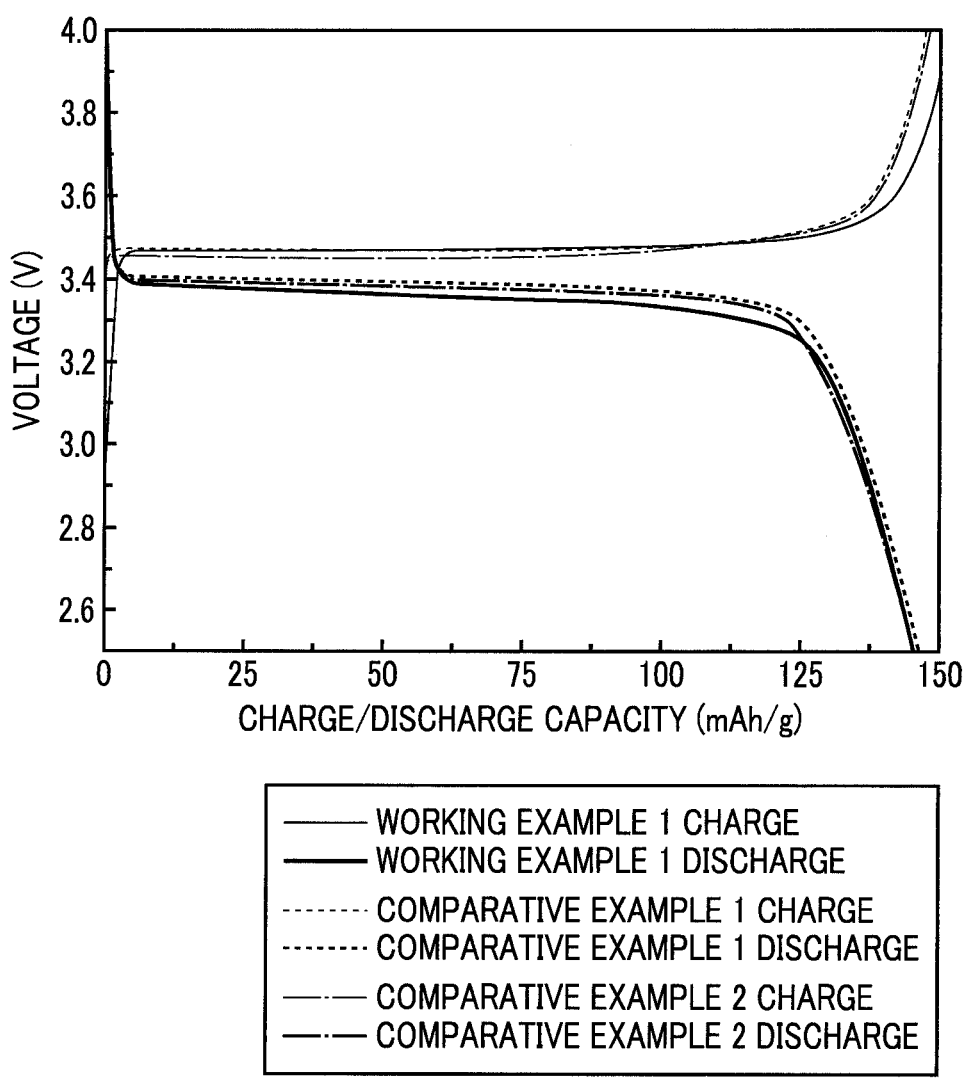
FIG. 3 is a graph illustrating a charge/discharge curve for a first cycle in the lithium ion secondary battery according to a Working Example of the present invention.
Figure 4:
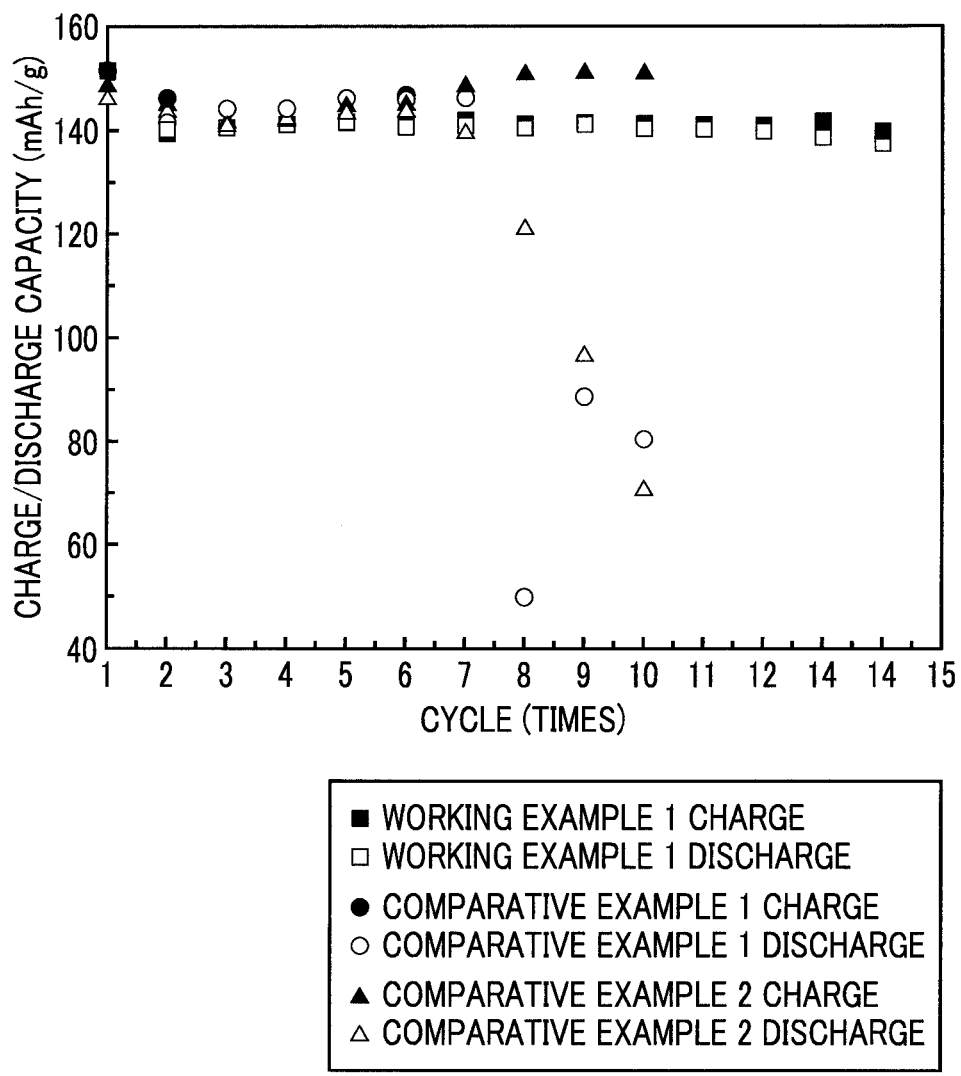
FIG. 4 is a graph illustrating a relationship between a charge/discharge cycle and a charge/discharge capacity in the lithium ion secondary battery according to a Working Example of the present invention.

The charge/discharge curve for the first cycle is illustrated in FIG. 3, and the relationship between the charge/discharge cycle and the charge/discharge capacity is illustrated in FIG. 4.

COMPARATIVE EXAMPLE 1

In this comparative example, a lithium ion conductive composite electrolyte was produced using, as the lithium ion conductive inorganic solid electrolyte particles, a glass ceramic represented by the chemical formula $Li_{0.9}Al_{0.2}Ti_{1.8}Si_{0.3}P_{2.7}O_{12}$ instead of the composite metal oxide represented by the chemical formula $Li_7La_3Zr_2O_{12}$ and having a garnet structure.

In this comparative example, first, the above-described glass ceramic and, as an organic polymer, an aqueous dispersion of 1.5 mass % carboxymethyl cellulose (CMC) and an aqueous dispersion of 40 mass % styrene-butadiene rubber (SBR) were weighed in a mass ratio of glass ceramic:CMC:SBR of 90:5:5, and then stirred using a planetary centrifugal mixer to obtain a mixture. Next, the resultant mixture was defoamed, and then further mixed using a thin-film spin mixer to obtain a paste in which the glass ceramic, the CMC, and the SBR were uniformly dispersed.

Next, a porous body was formed in exactly the same manner as Working Example 1, except that the above-described paste was used. As a result, a laminate was obtained in which a porous body 2, which was formed from the glass ceramic, the CMC, and the SBR, having a thickness of 46 μm was formed on the porous substrate 3. In the porous body 2, the volume ratio between the glass ceramic, and the CMC and SBR was 58.9:41.1.

Next, a lithium ion conductive composite electrolyte was formed in exactly the same manner as Working Example 1, except that this porous body was used.

Next, a lithium ion secondary battery was produced in exactly the same manner as Working Example 1, except that the lithium ion conductive composite electrolyte obtained in this comparative example was used.

Next, the charge/discharge capacity when charge/discharge was repeated at room temperature (25° C.) was measured in exactly the same manner as Working Example 1, except that the lithium ion secondary battery obtained in this comparative example was used. The charge/discharge curve for the first cycle is illustrated in FIG. 3, and the relationship between the charge/discharge cycle and the charge/discharge capacity is illustrated in FIG. 4.

COMPARATIVE EXAMPLE 2

In this comparative example, a lithium ion conductive composite electrolyte was produced using, as the lithium ion conductive inorganic solid electrolyte particles, MgO having a primary particle average particle size of 2 μm instead of the composite metal oxide represented by the chemical formula $Li_7La_3Zr_2O_{12}$ and having a garnet structure.

In this comparative example, first, the above-described MgO and, as an organic polymer, an aqueous dispersion of 1.5 mass % carboxymethyl cellulose (CMC), and an aqueous dispersion of 40 mass % styrene-butadiene rubber (SBR) were weighed in a mass ratio of MgO:CMC:SBR of 90:5:5, and then stirred using a planetary centrifugal mixer to obtain a mixture. Next, the resultant mixture was defoamed, and then further mixed using a thin-film spin mixer to obtain a paste in which the MgO, the CMC, and the SBR were uniformly dispersed.

Next, a lithium ion conductive composite electrolyte and a lithium ion secondary battery were produced in exactly the same manner as Comparative Example 1, except that this paste was used.

Next, the charge/discharge capacity when charge/discharge was repeated at room temperature (25° C.) was measured in exactly the same manner as Working Example 1, except that the lithium ion secondary battery obtained in this comparative example was used. The charge/discharge curve for the first cycle is illustrated in FIG. 3, and the relationship between the charge/discharge cycle and the charge/discharge capacity is illustrated in FIG. 4.

From FIG. 3, it can be seen that for the first charge/discharge, the lithium ion secondary battery of Comparative Example 1, in which a glass ceramic was used for the inorganic particles forming the porous body 2, and the lithium ion secondary battery of Comparative Example 2, in which MgO was used, have equivalent performance to that of the lithium ion secondary battery of Working Example 1, in which a composite metal oxide represented by the chemical formula $Li_7La_3Zr_2O_{12}$ and having a garnet structure was used.

However, when charge/discharge is repeated, although the lithium-ion secondary batteries of Comparative Examples 1 and 2 exhibit a sudden deterioration in charge/discharge capacity at the eighth cycle, the lithium ion secondary battery 11 of Working Example 1 maintains about the same charge/discharge capacity as the first cycle until the fourteenth cycle, thus clearly exhibiting excellent cycle performance.

The reason why the lithium-ion secondary batteries of Comparative Examples 1 and 2 exhibit a sudden deterioration in charge/discharge capacity at the eighth cycle is thought to be because of the positive electrode 12 and the negative electrode 13 short-circuiting due to the growth of dendrites in the lithium ion conductive composite electrolyte.

WORKING EXAMPLE 2

In this working example, first, lithium ion conductive inorganic solid electrolyte particles formed from a composite metal oxide represented by the chemical formula $Li_7La_3Zr_2O_{12}$ and having a garnet structure were prepared in exactly the same manner as Working Example 1.

Next, the composite metal oxide obtained in this working example and, as an organic polymer, an aqueous dispersion of 1.5 mass % carboxymethyl cellulose (CMC), and an aqueous dispersion of 40 mass % styrene-butadiene rubber (SBR) were weighed in a mass ratio of composite metal oxide:CMC:SBR of 95:2.5:2.5, and then stirred using a planetary centrifugal mixer to obtain a mixture. Next, the resultant mixture was defoamed, and then further mixed using a thin-film spin mixer to obtain a paste in which the composite metal oxide, the CMC, and the SBR were uniformly dispersed.

Next, this paste was deposited by a casting method using a doctor blade onto a porous substrate 3 formed from a microporous film made from polyethylene (PE) having a thickness of 25 μm and a void ratio of 42%, and then vacuum dried. As a result, a laminate was obtained in which a porous body 2 having a thickness of 46 μm and formed from the above-described composite metal oxide, CMC, and SBR was formed on the porous substrate 3. In the porous body 2, the volume ratio between the composite metal oxide, and the CMC and SBR was 54.4:45.6.

Next, $LiPF_6$ was dissolved in a mixed solvent of ethylene carbonate (EC) and diethyl carbonate (DEC) mixed in a 3:7 volume ratio to prepare an electrolyte solution in which the $LiPF_6$ concentration was 1 mol/liter. Then, 10 parts by mass of polyethylene glycol diacrylate (PEGDA) with a Mn of 258 (manufactured by Sigma-Aldrich Corporation) was mixed and stirred in 90 parts by mass of the above-described electrolyte solution. Then, 0.5 parts by mass of benzoyl peroxide as a polymerization initiator was added to 100 parts by mass of PEGDA, and the resultant mixture was thoroughly stirred to obtain a gel precursor.

Next, this gel precursor was impregnated into the laminate formed from the porous substrate 3 and the porous body 2 obtained in this working example to produce a lithium ion conductive composite electrolyte precursor.

Next, this lithium ion conductive composite electrolyte precursor was provided between a positive electrode 12 and a negative electrode 13, which were exactly the same as in Working Example 1, and heated for 30 minutes at 70° C. to turn the gel precursor into a gel, whereby a lithium ion secondary battery 11 was produced simultaneously with the formation of the lithium ion conductive composite electrolyte 1.

Figure 5:
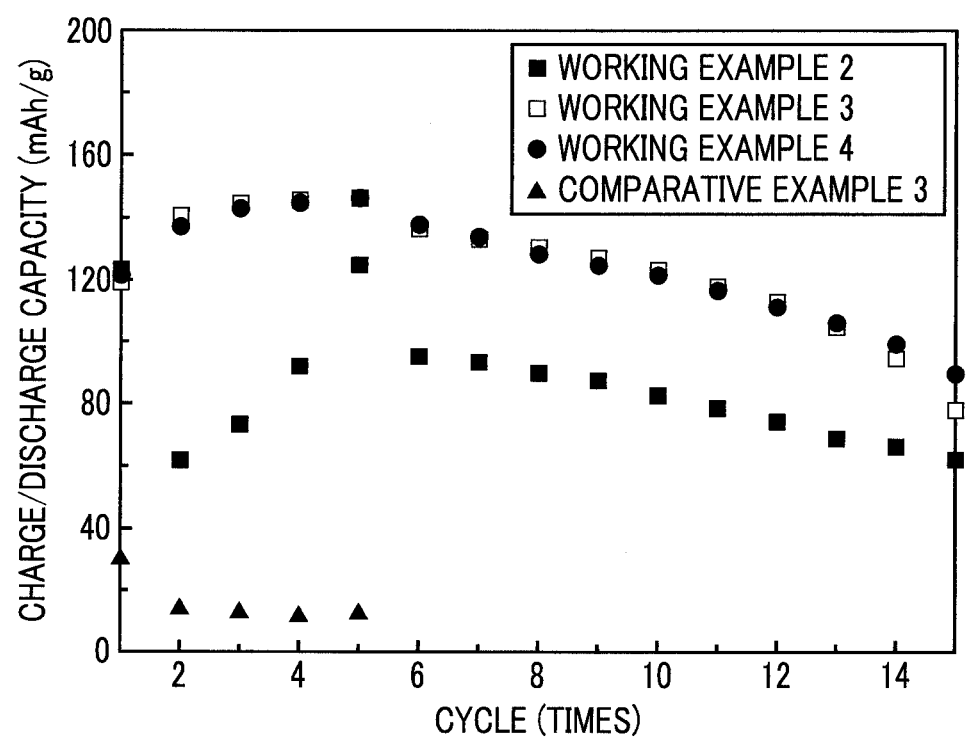
FIG. 5 is a graph illustrating a relationship between a charge/discharge cycle and a charge/discharge capacity in the lithium ion secondary battery according to another Working Example of the present invention.

Next, the charge/discharge capacity when charge/discharge was repeated at room temperature (25° C.) was measured in exactly the same manner as Working Example 1, except that the lithium ion secondary battery obtained in this working example was used. The relationship between the charge/discharge cycle and the charge/discharge capacity is illustrated in FIG. 5.

WORKING EXAMPLE 3

In this working example, first, as the lithium ion conductive inorganic solid electrolyte particles, a composite metal oxide represented by the chemical formula $Li_7La_3Zr_2O_{12}$ and having a garnet type structure was prepared in exactly the same manner as Working Example 1.

Next, in exactly the same manner as Working Example 2, a lithium ion secondary battery 11 was produced simultaneously with the formation of a lithium ion conductive composite electrolyte 1 by turning the gel precursor into a gel, except that this composite metal oxide and, as an organic polymer, an aqueous dispersion of 1.5 mass % carboxymethyl cellulose (CMC), and an aqueous dispersion of 40 mass % styrene-butadiene rubber (SBR) were weighed in a mass ratio of composite metal oxide:CMC:SBR of 98:1:1.

In this working example, the volume ratio in a porous body 2 between the composite metal oxide, and the CMC and SBR was 81.8:18.2.

Figure 6:
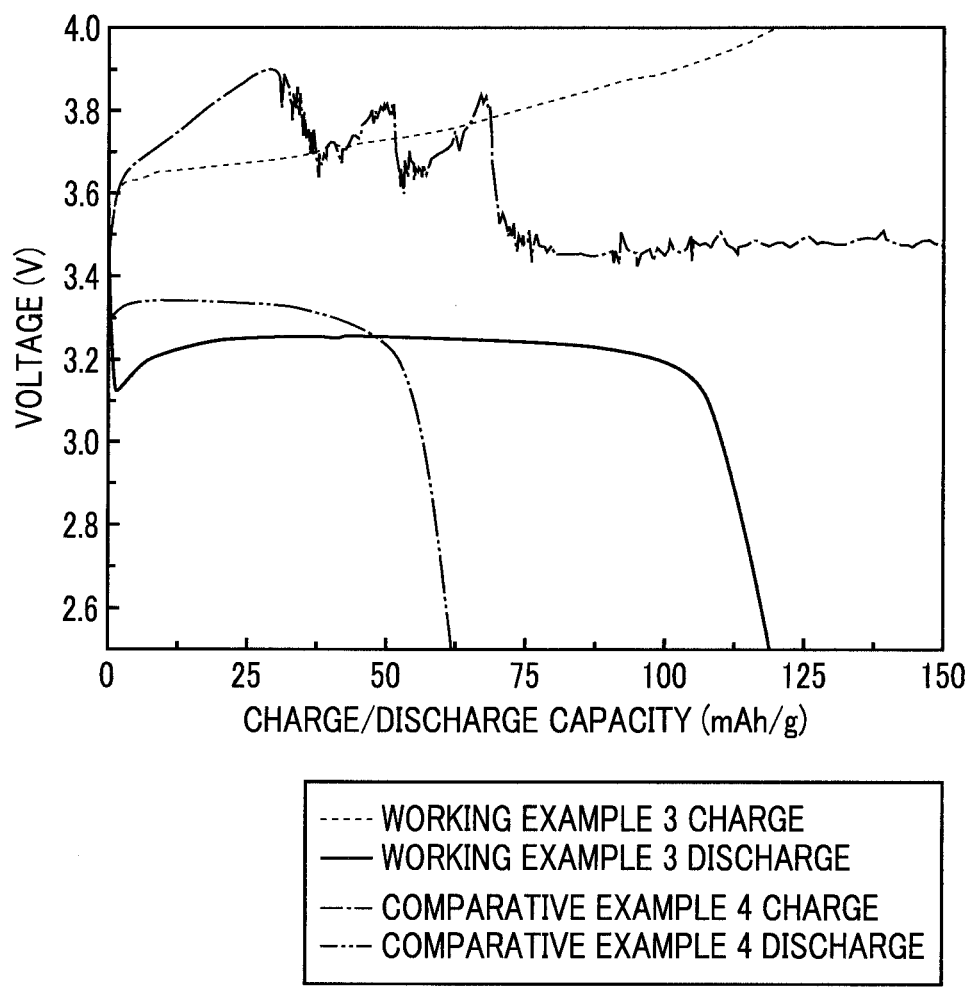
FIG. 6 is a graph illustrating a charge/discharge curve for a first cycle in the lithium ion secondary battery according to another Working Example of the present invention.

Next, the charge/discharge capacity when charge/discharge was repeated at room temperature (25° C.) was measured in exactly the same manner as Working Example 1, except that the lithium ion secondary battery obtained in this working example was used. The relationship between the charge/discharge cycle and the charge/discharge capacity is illustrated in FIG. 5. The charge/discharge curve for the first cycle is illustrated in FIG. 6.

WORKING EXAMPLE 4

In this working example, first, as the lithium ion conductive inorganic solid electrolyte particles, a composite metal oxide represented by the chemical formula $Li_7La_3Zr_2O_{12}$ and having a garnet structure was prepared in exactly the same manner as Working Example 1.

Next, in exactly the same manner as Working Example 2, a lithium ion secondary battery 11 was produced simultaneously with the formation of a lithium ion conductive composite electrolyte 1 by turning the gel precursor into a gel, except that this composite metal oxide and, as an organic polymer, an aqueous dispersion of 1.5 mass % carboxymethyl cellulose (CMC), and an aqueous dispersion of 40 mass % styrene-butadiene rubber (SBR) were weighed in a mass ratio of composite metal oxide:CMC:SBR of 99:0.5:0.5.

In this working example, the volume ratio in a porous body 2 between the composite metal oxide, and the CMC and SBR was 90.9:9.1.

Next, the charge/discharge capacity when charge/discharge was repeated at room temperature (25° C.) was measured in exactly the same manner as Working Example 1, except that the lithium ion secondary battery obtained in this working example was used. The relationship between the charge/discharge cycle and the charge/discharge capacity is illustrated in FIG. 5.

COMPARATIVE EXAMPLE 3

In this comparative example, first, as the lithium ion conductive inorganic solid electrolyte particles, a composite metal oxide represented by the chemical formula $Li_7La_3Zr_2O_{12}$ and having a garnet structure was prepared in exactly the same manner as Working Example 1.

Next, in exactly the same manner as Working Example 2, a lithium ion secondary battery 11 was produced simultaneously with the formation of a lithium ion conductive composite electrolyte 1 by turning the gel precursor into a gel, except that this composite metal oxide and, as an organic polymer, an aqueous dispersion of 1.5 mass % carboxymethyl cellulose (CMC), and an aqueous dispersion of 40 mass % styrene-butadiene rubber (SBR) were weighed in a mass ratio of composite metal oxide:CMC:SBR of 90:5:5.

In this comparative example, the volume ratio in a porous body 2 between the composite metal oxide, and the CMC and SBR was 45.6:54.4.

Next, the charge/discharge capacity when charge/discharge was repeated at room temperature (25° C.) was measured in exactly the same manner as Working Example 1, except that the lithium ion secondary battery obtained in this comparative example was used. The relationship between the charge/discharge cycle and the charge/discharge capacity is illustrated in FIG. 5.

COMPARATIVE EXAMPLE 4

In this comparative example, a lithium ion conductive composite electrolyte was produced using, as the lithium ion conductive inorganic solid electrolyte particles, a glass ceramic represented by the chemical formula $Li_{0.9}Al_{0.2}Ti_{1.8}Si_{0.3}P_{2.7}O_{12}$ instead of a composite metal oxide represented by the chemical formula $Li_7La_3Zr_2O_{12}$ and having a garnet structure.

In this comparative example, in exactly the same manner as Working Example 2, a lithium ion secondary battery 11 was produced simultaneously with the formation of a lithium ion conductive composite electrolyte 1 by turning the gel precursor into a gel, except that this glass ceramic and, as an organic polymer, an aqueous dispersion of 1.5 mass % carboxymethyl cellulose (CMC), and an aqueous dispersion of 40 mass % styrene-butadiene rubber (SBR) were weighed in a mass ratio of glass ceramic:CMC:SBR of 98:1:1.

In this comparative example, the volume ratio in a porous body 2 between the glass ceramic, and the CMC and SBR was 90.0:10.0.

Next, the charge/discharge capacity when charge/discharge was repeated at room temperature (25° C.) was measured in exactly the same manner as Working Example 1, except that the lithium ion secondary battery obtained in this comparative example was used. The charge/discharge curve for the first cycle is illustrated in FIG. 6.

From FIG. 5, it can be seen that for the lithium ion secondary batteries of Working Examples 2 to 4, in which the volume ratio in the porous body 2 between the composite metal oxide, and the CMC and SBR was in the range of 54.4:45.6 to 90.9:9.1, the charge/discharge capacity at the fifth cycle is in the range of 124.4 to 145.4 mAh/g, whereas for the lithium ion secondary battery of Comparative Example 3, in which the volume ratio was 45.6:54.4, the charge/discharge capacity at the fifth cycle is 12.2 mAh/g.

Therefore, according to the lithium ion secondary batteries of Working Examples 2 to 4, in which the volume ratio between the composite metal oxide, and the CMC and SBR was in the range of 54.4:45.6 to 90.9:9.1, it is clear that an excellent charge/discharge capacity can be obtained.

In the lithium ion secondary battery of Comparative Example 3, the reason why a sufficient charge/discharge capacity could not be obtained is thought to be because the amount of CMC and SBR was excessive, so that the composite metal oxide surface was covered.

Further, from FIG. 6, it can be seen that for the lithium ion secondary battery of Working Example 3, which used a composite metal oxide represented by the chemical formula $Li_7La_3Zr_2O_{12}$ and having a garnet structure as the lithium ion conductive inorganic solid electrolyte particles, the charge/discharge capacity was close to the theoretical value, so that it is clear that an excellent charge/discharge capacity can be obtained.

In contrast, for the lithium ion secondary battery of Comparative Example 4, which used a glass ceramic represented by the chemical formula $Li_{0.9}Al_{0.2}Ti_{1.8}Si_{0.3}P_{2.7}O_{12}$ as the lithium ion conductive inorganic solid electrolyte particles, a sudden drop in voltage occurs around 25 mAh/g during charging, so that a fully-charged behavior is not exhibited even past about 150 mAh/g, which is the theoretical capacity of iron lithium phosphate ($LiFePO_4$). Further, the discharge capacity is also only about 60 mAh/g, so that a sufficient charge/discharge capacity cannot be obtained.

In the lithium ion secondary battery of Comparative Example 4, the reason why a sufficient charge/discharge capacity could not be obtained is thought to be because the glass ceramic is more susceptible to being reduced than the metal lithium serving as the negative electrode active material.

WORKING EXAMPLE 5

In this working example, first, a paste was prepared by mixing a Si powder having an average particle size of 10 μm, Ketjenblack, and a polyimide varnish in a mass ratio of Si powder:Ketjenblack:polyimide of 75:10:15. Next, this paste was deposited by a casting method using a doctor blade onto an electrolytic copper foil having a thickness of about 40 μm, and then vacuum dried for 2 hours at a temperature of 300° C. to produce a negative electrode formed from Si.

Next, a lithium ion secondary battery was produced in exactly the same manner as Working Example 1, except that the negative electrode formed from Si obtained in this working example was used.

Next, the charge/discharge capacity when charge/discharge was repeated at room temperature (25° C.) was measured in exactly the same manner as Working Example 1, except that the lithium ion secondary battery obtained in this working example was used. The charge/discharge curve for the first cycle is illustrated in FIG. 7.

COMPARATIVE EXAMPLE 5

In this comparative example, a lithium ion secondary battery was produced in exactly the same manner as Comparative Example 1, except that the exactly same negative electrode formed from Si as that produced in Working Example 5 was used.

Next, the charge/discharge capacity when charge/discharge was repeated at room temperature (25° C.) was measured in exactly the same manner as Working Example 1, except that the lithium ion secondary battery obtained in this comparative example was used. The charge/discharge curve for the first cycle is illustrated in FIG. 7.

Further, from FIG. 7, it can be seen that for the lithium ion secondary battery of Working Example 5, which used a composite metal oxide represented by the chemical formula $Li_7La_3Zr_2O_{12}$ and having a garnet structure as the lithium ion conductive inorganic solid electrolyte particles, the charge/discharge capacity was close to the theoretical value, so that it is clear that an excellent charge/discharge capacity can be obtained.

In contrast, for the lithium ion secondary battery of Comparative Example 5, which used a glass ceramic represented by the chemical formula $Li_{0.9}Al_{0.2}Ti_{1.8}Si_{0.3}P_{2.7}O_{12}$ as the lithium ion conductive inorganic solid electrolyte particles, a drop in voltage occurs around 25 mAh/g during charging, so that a fully-charged behavior is not exhibited even past about 150 mAh/g, which is the theoretical capacity of iron lithium phosphate ($LiFePO_4$). Further, the discharge capacity is also only about 50 mAh/g, so that a sufficient charge/discharge capacity cannot be obtained.

Therefore, it is clear that the lithium ion secondary battery using the lithium ion conductive composite electrolyte according to the present invention can obtain an excellent charge/discharge capacity even when using Si for the negative electrode.

What is claimed is:

1. A lithium ion conductive composite electrolyte comprising a composite electrolyte in which a lithium ion conductive polymer gel electrolyte is held in a porous body formed from lithium ion conductive inorganic solid electrolyte particles,
    wherein the porous body is formed from an organic polymer, and lithium ion conductive inorganic solid electrolyte particles that are formed from a composite metal oxide that is represented by the chemical formula $Li_{7-y}La_{3-x}A_xZr_{-y}M_yO_{12}$ (wherein 0≤x≤3, 0≤y≤2, A is one metal selected from the group consisting of Y, Nd, Sm, and Gd, and M is one metal selected from Nb or Ta), and that has a garnet structure, and
    the organic polymer forming the porous body comprises a polyimide.

2. A lithium ion conductive composite electrolyte, comprising a composite electrolyte in which a lithium ion conductive polymer gel electrolyte is held in a porous body formed from lithium ion conductive inorganic solid electrolyte particles,
    wherein the porous body is formed from an organic polymer, and lithium ion conductive inorganic solid electrolyte particles that are formed from a composite metal oxide that is represented by the chemical formula $Li_{7-y}La_{3-x}A_xZr_{2-y}M_yO_{12}$ wherein 0≤x≤3, 0≤y≤2, A is one metal selected from the group consisting of Y, Nd, Sm, and Gd, and M is one metal selected from Nb or Ta), and that has a garnet structure, and the organic polymer forming the porous body comprises a mixture of styrene-butadiene rubber and polycarboxymethyl cellulose.

3. A lithium ion conductive composite electrolyte comprising a composite electrolyte in which a lithium ion conductive polymer gel electrolyte is held in a porous body formed from lithium ion conductive inorganic solid electrolyte particles, wherein the porous body is formed from an organic polymer, and lithium ion conductive inorganic solid electrolyte particles that are formed from a composite metal oxide that is represented by the chemical formula $Li_{7-y}La_{3-x}A_xZr_{2-y}M_yO_{12}$ (wherein $0 \leq x \leq 3$, $0 \leq y \leq 2$, A is one metal selected from the group consisting of Y, Nd, Sm, and Gd, and M is one metal selected from Nb or Ta), and that has a garnet structure, the lithium ion conductive polymer gel electrolyte comprises a lithium ion conductive electrolyte solution and a polymer capable of internally absorbing the electrolyte solution, and the polymer capable of internally absorbing the lithium ion conductive electrolyte solution comprises polyacrylonitrile.

4. A lithium ion conductive composite electrolyte comprising a composite electrolyte in which a lithium ion conductive polymer gel electrolyte is held in a porous body formed from lithium ion conductive inorganic solid electrolyte particles, wherein the porous body is formed from an organic polymer, and lithium ion conductive inorganic solid electrolyte particles that are formed from a composite metal oxide that is represented by the chemical formula $Li_{7-y}La_{3-x}A_xZr_{2-y}M_yO_{12}$ (wherein $0 \leq x \leq 3$, $0 \leq y \leq 2$, A is one metal selected from the group consisting of Y, Nd, Sm, and Gd, and M is one metal selected from Nb or Ta), and that has a garnet structure, the lithium ion conductive polymer gel electrolyte comprises a lithium ion conductive electrolyte solution and a polymer capable of internally absorbing the electrolyte solution, and the polymer capable of internally absorbing the lithium ion conductive electrolyte solution comprises a thermosetting polymer obtained by polymerization of polyethylene glycol diacrylate.

* * * * *